US012564201B2

(12) United States Patent
Ochiai et al.

(10) Patent No.: US 12,564,201 B2
(45) Date of Patent: Mar. 3, 2026

(54) PLANT-BASED TEXTURED BASE MATERIAL, AND PRODUCT CONTAINING REPLICA MEAT OBTAINED BY PROCESSING SAID BASE MATERIAL

(71) Applicant: DIAZ INC., Kumamoto City (JP)

(72) Inventors: Koji Ochiai, Kumamoto City (JP); Tsuyoshi Ide, Kumamoto City (JP)

(73) Assignee: DIAZ INC., Kumamoto City (JP)

( * ) Notice: Subject to any disclaimer, the term of this patent is extended or adjusted under 35 U.S.C. 154(b) by 337 days.

(21) Appl. No.: 18/269,865

(22) PCT Filed: Jul. 2, 2021

(86) PCT No.: PCT/JP2021/025209
§ 371 (c)(1),
(2) Date: Jun. 27, 2023

(87) PCT Pub. No.: WO2022/145079
PCT Pub. Date: Jul. 7, 2022

(65) Prior Publication Data
US 2024/0315278 A1 Sep. 26, 2024

(30) Foreign Application Priority Data
Dec. 28, 2020 (JP) ................................. 2020-219452

(51) Int. Cl.
*A23J 3/22* (2006.01)
*A23J 3/16* (2006.01)
*A23L 11/70* (2021.01)

(52) U.S. Cl.
CPC ................. *A23J 3/227* (2013.01); *A23J 3/16* (2013.01); *A23L 11/70* (2021.01)

(58) Field of Classification Search
None
See application file for complete search history.

(56) References Cited

U.S. PATENT DOCUMENTS

2017/0265375 A1 9/2017 Ide et al.

FOREIGN PATENT DOCUMENTS

| | | | |
|---|---|---|---|
| JP | 2008125515 | A | 6/2008 |
| JP | 2016101139 | A | 6/2016 |
| JP | 6495990 | B2 | 3/2019 |
| JP | 2020512821 | A | 4/2020 |
| WO | 2015108142 | A1 | 7/2015 |
| WO | 2018185318 | A1 | 10/2018 |

OTHER PUBLICATIONS

Freshness Burger, DAIZ's plant meat 'Miracle Meat' had been adopted for 'The Good Burger' news release dated Aug. 31, 2020, posted on DIAZ Inc. website was archived Nov. 1, 2020 online, 11 pages.
"Kagayake! Startup (25) DAIZ Inc.", Article posted on p. 29 of Nikkan Kogyo Shimbun on Jan. 16, 2020, 2 pages.
"Multi-meat mimicry: Japan's DAIZ develops new soybean processing technology that mimics traditional meat", Food navigator-asia.com, Oct. 6, 2020, 2 pages.
"Q&A", non-official translation, World web archive, Archiving the page of vegetable meat posted on the DAIZ Inc. website, Jun. 5, 2020, 19 pages.
"Q&A", non-official translation, World web archive, Archiving the page of vegetable meat posted on the DAIZ Inc. website, Nov. 17, 2020, 18 pages.
Anzo, Yasushi, "Soy Meat is no longer 'fake'. How to make a soy meat burger delicious by asking a plant meat venture", Business Insider Japan Dec. 9, 2020, 32 pages.
Tsuruta, Hiromi et al., "Research on functionality and processing characteristics of novel high oleic acid soybeans", Research Report of 2013 Industrial Technology Center of SAGA, 2013, pp. 13-18.
International Search Report for corresponding International Application No. PCT/JP2021/025209; Mailing Date, Sep. 7, 2021.

*Primary Examiner* — Jyoti Chawla
(74) *Attorney, Agent, or Firm* — CANTOR COLBURN LLP

(57) ABSTRACT

Provided are a plant-based fibrous base material in which any unpleasant odor is suppressed, and a product containing a replica meat obtained by processing said base material. The plant-based textured base material contains a plant-protein-containing fibrous structure, linoleic acid and linolenic acid in an amount of no more than 25 mg/dry weight base material (g) in total, phospholipids in an amount of at least 0.5 mg/dry weight base material (g), and protein in an amount of no more than 540 mg/base material dry weight (g). The base material preferably has stress in an amount of at least $0.7 \times 10^5$ Pa.

7 Claims, 3 Drawing Sheets

ELASTICITY TEST BY RHEOMETER

☐ TEXTURED     △ ROASTED CHICKEN    ○ BOILED CHICKEN
BASE MATERIAL

ELASTICITY TEST BY RHEOMETER

□ TEXTURED          ◇ BENCHMARK
BASE MATERIAL

ELASTICITY TEST BY RHEOMETER

□ TEXTURED
   BASE MATERIAL

◇ UNTREATED
   BASE MATERIAL

PLANT-BASED TEXTURED BASE MATERIAL, AND PRODUCT CONTAINING REPLICA MEAT OBTAINED BY PROCESSING SAID BASE MATERIAL

CROSS REFERENCE TO RELATED APPLICATIONS

This is the U.S. national stage of application No. PCT/JP2021/025209, filed on Jul. 2, 2021. Priority under 35 U.S.C. § 119(a) and 35 U.S.C. § 365(b) is claimed from Japanese Application No. 2020-219452, filed Dec. 28, 2020, the disclosure of which is also incorporated herein by reference.

TECHNICAL FIELD

The present invention relates to a plant-based textured base material, and a product containing a replica meat obtained by processing the base material.

BACKGROUND ART

The plant-based textured base material has been widely used as a meat alternative and the like. Conventional base materials are commonly those obtained by extrusion of soybean seeds or oil cake thereof.

When soybean seeds are used, oil is separated from the seeds in the course of extrusion, which causes an extruder to spin and inhibits the formation of fibers. Consequently, it is difficult to realize a base material having texture close to that of meat. Therefore, technical common knowledge is to add a large amount of purified protein to promote the formation of fibers (for example, see Patent Document 1). However, the problem of an unpleasant odor due to oil separated from soybean seeds is not solved. Meanwhile, when oil cake is used, not only does the oil cake itself already have an unpleasant odor, but also an event of burning and the like inside an extruder easily occurs due to an insufficient amount of oil. Therefore, the technical common knowledge is to add a vegetable oil into a barrel; however, the unpleasant odor can further increase due to the added oil.

Patent Document 1: Japanese Patent No. 6495990

DISCLOSURE OF THE INVENTION

Problems to be Solved by the Invention

The present invention has been made in view of the above circumstances, and an object thereof is to provide a plant-based textured base material in which an unpleasant odor is suppressed, and a product containing a replica meat obtained by processing the base material.

Means for Solving the Problems

Based on a hypothesis that an oil which inhibits the formation of fibers in extrusion and also provides an unpleasant odor is free fatty acids existing in the cytoplasm of seeds, meanwhile phospholipids forming cell membranes do not easily cause such defects, the present inventors have completed the present invention. Specifically, the present invention provides the following.

(1) A plant-based textured base material, including:
  a fibrous structure containing plant protein, linoleic acid and linolenic acid in a total amount of equal to or less than 25 mg/g dry weight base material,
  phospholipids in an amount of equal to or greater than 0.5 mg/g dry weight base material, and
  protein in an amount of equal to or less than 540 mg/g dry weight base material.

(2) The base material according to (1), which has a protein amount of equal to or less than 520 mg/g dry weight base material.

(3) The base material according to (1) or (2), having a stress of equal to or greater than $0.7 \times 10^5$ Pa.

(4) The base material according to any one of (1) to (3), which has an amino acid amount of equal to or greater than 800 µg/g dry weight base material.

(5) The base material according to any one of (1) to (4), wherein the base material is produced by using germinated soybean seeds as a raw material.

(6) The base material according to (5), wherein the base material is produced by further using germinated seeds of beans other than soybeans as the raw material and is swollen.

(7) A product containing a replica meat obtained by processing the base material according to any one of (1) to (6).

Effects of the Invention

According to the present invention, it is possible to provide a plant-based fibrous base material in which an unpleasant odor is suppressed, and a product containing a replica meat obtained by processing said base material.

PREFERRED MODE FOR CARRYING OUT THE INVENTION

Figure 1:
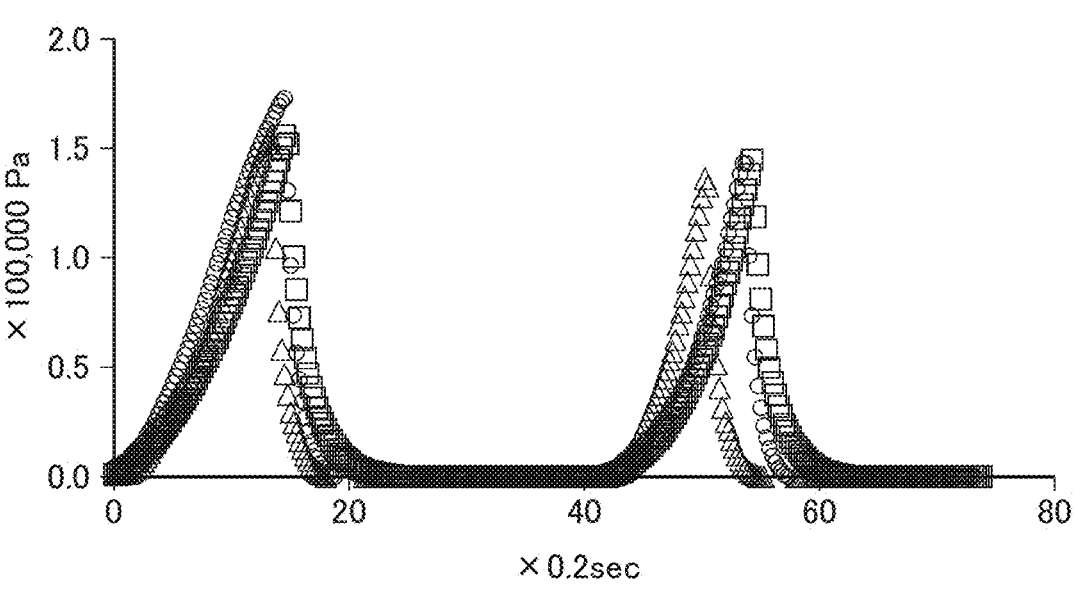
FIG. 1 is a graph which shows the stress profile of the base material according to Example of the present invention.

Embodiments of the present invention will now be described. It should be noted, however, that the present invention is not limited thereto.

<Textured Base Material>

Although a plant-based textured base material according to an embodiment has a fibrous structure containing plant protein, both the amount of protein and the total amount of linoleic acid and linolenic acid are not excessive. This is because, by using a plant material containing a suitable amount of phospholipids, excessive oil separation does not occur in the course of extrusion, meanwhile burning can be suppressed, which provides sufficient extrusion and smooth formation of fibers.

In addition, linoleic acid and linolenic acid have odors peculiar to plants, which are further converted into unpleasant odors such as hexanal and caproic acid when oxidized. In the embodiment, however, the total amount thereof is not excessive, and thus an off-flavor and an unpleasant odor can also be suppressed.

In an embodiment, the total amount of linoleic acid and linolenic acid is equal to or less than 25 mg/g dry weight base material, and preferably equal to or less than 20 mg/g dry weight base material, equal to or less than 17.5 mg/g dry weight base material, or equal to or less than 16 mg/g dry weight base material from the viewpoint of suppressing an unpleasant odor and easily forming a sufficiently developed fibrous structure.

The above total amount is not particularly limited and may be equal to or greater than 3 mg/g dry weight base material, equal to or greater than 6 mg/g dry weight base material, or equal to or greater than 10 mg/g dry weight base material from the viewpoint of easily suppressing burning in the course of extrusion by a balance with the amount of phospholipids.

In each embodiment, the dry weight base material is obtained by the following method.

A crushed sample is applied to about 80% of a specimen container and measurements are made in the "Slow mode" of a calibrated portable water activity meter "LabSwift-aw" (novasina). At this time, water activity is adjusted to AW0.6.

In an embodiment, the amount of phospholipids is equal to or greater than 0.5 mg/g dry weight base material as stearo-oleo-lecithin, and is preferably equal to or greater than 1.0 mg/g dry weight base material, equal to or greater than 2.0 mg/g dry weight base material, or equal to or greater than 3.0 mg/g dry weight base material from the viewpoint of easily suppressing burning in the course of extrusion with a balance of the total amount of linoleic acid and linolenic acid.

The above amount is not particularly limited and may be equal to or less than 10 mg/g dry weight base material, equal to or less than 7.5 mg/g dry weight base material, or equal to or less than 5 mg/g dry weight base material.

In an embodiment, the base material meets the above requirements, and moreover the total amount of lipid may be 75 to 200 mg/g dry weight base material (specifically 100 to 150 mg/g dry weight base material). In this case, burning in the course of extrusion is easily suppressed, and well-balanced organoleptic properties are easily provided.

In the present invention, the amount of linoleic acid and linolenic acid in the base material is obtained by the following method. A chloroform:methanol solution (mixing ratio 2:1) is added to a test substance to extract lipids. The extract is dried to prepare the total lipids. The total lipids are made to a fixed volume with chloroform, and an internal standard is added thereto, and the obtained mixture is dried and hardened again. The dried test substance is dissolved in a 5% HCl-methanol solution, and the obtained solution is heated to generate fatty acid methyl esters. By liquid-liquid separation using a 5% HCl-methanol solution and hexane, the fatty acid methyl esters are transferred to the hexane layer. Finally, this hexane layer is used for gas chromatography, and the fatty acid composition thereof is calculated using peak areas.

The amount of phospholipids in the base material is obtained by the following method. A chloroform:methanol solution (mixing ratio 2:1) is added to a test substance to extract lipids. The extract is dried to prepare the total lipids. The extracted lipid is incinerated, and ammonium molybdate and sodium hydrogen sulfite are added thereto. Finally, the blue color of this solution is compared to obtain the amount of phospholipids.

The amount of all lipids in the base material is obtained by the Soxhlet extraction method using diethyl ether.

In an embodiment, the amount of protein is equal to or less than 540 mg/g dry weight base material, and from the viewpoint of not using a protein adding material in an amount higher than required to form a sufficient fibrous structure, preferably equal to or less than 520 mg/dry weight base material, or equal to or less than 360 mg/dry weight base material. These amounts are unexpectedly low in view of technical common knowledge that protein in an amount of equal to or greater than 530 mg/dry weight base material and ideally equal to or greater than 550 mg/dry weight base material is required to form a fibrous structure.

The above amount is not particularly limited and may be equal to or greater than 360 mg/dry weight base material from the viewpoint of easily having a sufficient fibrous structure with a balance of the total amount of linoleic acid and linolenic acid.

In an embodiment, the fibrous structure may be in a sponge form or fibrous form. Such base material preferably has strong elasticity and a stress of equal to or greater than $0.7 \times 10^5$ Pa. Because of this, the base material has textured properties and is not disconnected in a proper degree. For example, when it is used as a food or animal feed, cooking and meals can be enjoyed with feelings close to those of meat, and texture close to that of meat can be provided during mastication. In addition, when it is used as fish bait, it does not easily become fine grain in water, and thus is efficiently incepted. The stress of the base material is more preferably equal to or greater than $1.0 \times 10^5$ Pa, equal to or greater than $1.2 \times 10^5$ Pa, or equal to or greater than $1.5 \times 10^5$ Pa.

Meanwhile, the stress of the base material is not particularly limited and may be equal to or less than $3.0 \times 10^5$ Pa, or equal to or less than $2.0 \times 10^5$ Pa by a balance with performance required for final uses and the amounts of protein, phospholipids, linoleic acid and linolenic acid to achieve it.

In the present invention, the stress of the base material is obtained by the following method. Using "RHEONER II CREEP METER RE2-33005B" (manufactured by YAMADEN Co., Ltd.), an elasticity test is carried out with a plunger of L50 mm×φ16 mm at a measurement distortion rate of 50% and a measurement speed of 5 [mm/sec], and the average value of the first two peaks in the obtained stress profile is used as the stress of a base material.

In an embodiment, the amount of amino acids is preferably equal to or greater than 500 μg/g dry weight base material. As described above, the base material of the present invention is a plant-based fibrous base material in which an off-flavor and an unpleasant odor are suppressed, and therefore when an appropriate amount of amino acids to provide umami are included, organoleptic properties close to those of meat and the like as a whole can be provided. The above amount is more preferably equal to or greater than 600 mg/ml, equal to or greater than 700 mg/ml, or equal to or greater than 800 mg/ml.

In addition, the base material of the present invention is a plant-based fibrous base material in which an off-flavor and an unpleasant odor are suppressed, and therefore masking using an excessive amount of amino acids and improvements in organoleptic properties are not required. From this viewpoint, the above amount is not particularly limited, and may be equal to or less than 2000 μg/g dry weight base material, equal to or less than 1500 μg/g dry weight base material, or equal to or less than 1200 μg/g dry weight base material.

Contrarily, conventional base materials do not have a fibrous structure and/or have an unpleasant odor, and thus even if the above amount of amino acids is included, unnatural organoleptic properties as a whole are easily obtained.

The total amount of glutamic acid, aspartic acid, alanine, serine, glycine, and threonine, free amino acids relating to taste, among amino acids may be about 300 to 750 µg/g (specifically equal to or greater than 400 µg/g, or equal to or greater than 500 µg/g). Because of this, a product having an especially good taste, coupled with the above excellent organoleptic properties such as texture and a flavor can be provided.

In the present invention, the amount of amino acids in the base material is measured using a precolumn derivatization method via UHPLC. The details are as follows.

Device: high performance liquid chromatograph (UHPLC) manufactured by SHIMADZU CORPORATION, Detector: fluorescence detector, Column: "Inerstil ODS-4 HP 3 µm" (100 mm L×3.0 mm I.D.) manufactured by GL Sciences Inc., Column temperature: 35° C., Elution buffer composition: 15 mmol/L potassium dihydrogen phosphate, 5 mmol/L dipotassium hydrogen phosphate, water/acetonitrile/methanol=15/45/40 (V/V/V), Flow rate: 0 to 1.5 min 9.5%, 1.5 to 6.0 min 30%, 6.0 to 11.0 min 40%, 11.0 to 16.0 min 100%, and Flow rate: 0.8 ml/min.

In an embodiment, the base material is preferably produced using germinated soybean seeds as a raw material. In the course of germination treatment, linoleic acid and linolenic acid, free fatty acids, existing in the cytoplasm of seeds can be converted into phospholipids forming cell membranes. It is also found that in the course of germination treatment, the abundant amount of protein contained in soybean seeds does not largely decrease, while the amount of amino acids increases. Therefore, when germinated soybean seeds are used as the raw material, the base material according to the above embodiment can be produced without depending on excessive additives.

It should be noted that the germination treatment to soybean seeds can be carried out, for example, using methods disclosed in Japanese Unexamined Patent Application Publication No. 2008-125515 and No. 2016-101139. Specifically, plant seeds are held in atmosphere conditions with a carbon dioxide concentration of equal to or greater than 400 ppm and/or an oxygen concentration of equal to or less than 19 vol %, and the plant seeds are only required to be held in the range of germination temperature over a few hours (e.g., two hours or longer).

However, the treatment is not limited to these methods, and an appropriate germination treatment may be used. A treatment for removing linoleic acid and linolenic acid, and addition of materials containing high concentrations of protein and amino acids may be combined as needed.

In an embodiment, the base material meets the above requirements, and moreover may have a total carbohydrate amount of 5 mass % to 50 mass %. As described above, the base material of the present invention is a plant-based fibrous base material in which an off-flavor and an unpleasant odor are suppressed, and therefore when an appropriate amount of carbohydrate to provide sweet taste and viscosity is included, organoleptic properties close to those of meat and the like as a whole can be provided, and also masking using an excessive amount of carbohydrate and improvements in organoleptic properties are not required.

Contrarily, conventional base materials do not have a fibrous structure and/or have an unpleasant odor, and therefore even if the above amount of carbohydrate is included, unnatural organoleptic properties as a whole are easily obtained.

In an embodiment, the base material may be one which is produced by further using germinated seeds of beans other than soybeans as the raw material and is swollen. Because the germinated bean seeds other than soybeans contain starch, ingredients for the base material released from a high temperature extruder with water contained are rapidly swollen and then form a swollen structure. In addition, compared to starch, ungerminated bean seeds, and the like, germinated bean seeds are whole foods and also have an excellent nutritional balance, and therefore the base material in the present embodiment is advantageous because it has organoleptic properties by the swollen structure and also an excellent nutritional balance. It should be noted that without sticking to the latter's advantage, a swollen base material which is produced further using ungerminated bean seeds and starch (e.g., grain starch such as corn starch) as raw materials, or without using these starch-rich raw materials (for example, only using germinated soybean seeds) is also encompassed in the present invention.

The bean seeds other than soybeans are not particularly limited, and include oilseeds such as peas, rapeseeds, cottonseeds, peanuts, sesame seeds, safflower, sunflower, corn, safflower, and coconuts. Among these, peas are preferred because performance control by the germination treatment is easy.

The swelling degree may be appropriately set depending on organoleptic properties and physical properties required for base materials and can be adjusted by the amount of starch and the extruder temperature (as either increases, the swelling degree increases). The bulk specific gravity is not particularly limited and may be equal to or greater than 100 g/liter and equal to or less than 250 g/liter. A base material having a bulk specific gravity of equal to or less than 160 g/liter (specifically equal to or less than 125 g/liter, or equal to or less than 110 g/liter) preferably has, but not limited to, germinated bean seeds other than soybeans or ungerminated bean seeds, or starch (e.g., grain starch such as corn starch) from the viewpoint of the ease of production. It should be noted that a base material which is not swollen (having equal to or less than an extremely low amount of starch) is also encompassed in the present invention.

In an embodiment, the water amount in the base material may be 5 to 33%.

In an embodiment, the base material may appropriately include various additives, flavorings, and the like.

The shape of the base material is not particularly limited, and may be an indefinite, granular, flake (flat), block, sheet, string shape, or the like. These are formed by the shape or size of a mouthpiece on the extruder outlet, or processing after extrusion.

(Method for Producing Base Material)

The raw materials are pressurized and heated using an extruder (extrusion molding machine) and extruded from a die located on the end of the screws to the normal pressure atmosphere to produce a base material. The extrudate may be cut and dried as needed. In an embodiment, the pressure and temperature at the time of extrusion may be equal to or greater than one atmosphere of pressure and 190° C. or higher, respectively. Even under such pressurizing and heating conditions, burning is suppressed because the raw materials in the embodiment include suitable amounts of phospholipids, and also an unpleasant odor is suppressed because the amount of linoleic acid and linolenic acid is not excessive, and also inhibitions about the formation of a fibrous structure by causing an extruder to spin do not easily occur. In addition, a case where it is desired to produce a swollen base material can be also easily realized on such pressurizing and heating conditions.

In an embodiment, the pressure and temperature at the time of extrusion may be above one atmosphere of pressure and equal to or less than 20 atmospheres of pressure, and 290° C. or lower (specifically 230° C. or lower), respectively. The separation of phospholipids from seeds hardly occurs, and a sufficiently developed fibrous structure is easily formed within the pressurizing and heating conditions of this degree. In addition, a highly swollen base material is easily produced in conditions close to the pressurizing and heating conditions (specifically 10 to 20 atmospheres of pressure, and 200 to 230° C.).

It is preferred that the raw materials right before the above extrusion have a water amount of 15 to 30 mass % because they are safely and easily swollen to a proper extent. A common method for adjusting the water amount is mixing a material having a relatively lower water amount than of plant seeds (e.g., whole wheat flour of plant seeds such as soybean, purified protein of a plant such as soybean, and starch of a plant such as corn) with plant seeds.

Alternatively, the above extrusion may be carried out after evaporation of excess water by preliminary extrusion at equal to or less than one atmosphere pressure (i.e., not pressurizing) and 100° C. or lower. Furthermore, as another method, plant seeds (e.g., germinated plant seeds such as germinated soybean seeds) with a water amount of equal to or greater than 30 mass % (specifically 50 to 70 mass %) are put in an extruder, the extruder is set so that the pressure and temperature will increase from the upstream to downstream of a barrel (specifically having the upstream zone of equal to or less than one atmosphere of pressure and 100° C. or lower and the downstream zone of above one atmosphere of pressure and equal to or less than 20 atmospheres of pressure and above 100° C. and 290° C. or lower), and water vapor in the barrel may be released before reaching a high pressure and temperature range. These methods are preferred because they do not excessively depend on additives and thus the nutritional balance of plant seeds is not easily lost.

As for the extruder, either one-screw extrusion or twin-screw extrusion may be used. In the case of twin-screw extrusion, either counter-rotation or co-rotation may be used. In addition, the pressure and temperature in the extruder may be uniform across all regions or different among the regions.

(Product)

In an embodiment, the product is obtained by processing the above-described base material. Reconstitution with water, addition of a binding material, and heat cooking, for example, may be carried out as needed depending on the dry state of the base material.

The uses thereof are not particularly limited and include, for example, meat-like foods (for human and for pet animals), domestic animal feed, and fish bait.

The meat-like foods may include a replica meat, for example, animal meat-like foods such as beef, pork, chicken, rabbit meat, and crocodile meat; fish-like foods such as tuna meat, mackerel meat, and salmon; and processed meats such as ham, sausage, and bacon. The form of replica meat may be, for example, minced meat, one piece of meat, meat paste or a freeze dried form. In addition, the product may include only a replica meat or include a replica meat with another material (mixing, wrapping, and sandwiching). Typical examples thereof include broiled foods such as hamburger steaks, and steaks; deep-fried foods such as nuggets, fried chicken, and cutlets; pastes such as patties and meatballs; steamed bread such as Chinese dumplings, gyoza dumplings, and steamed buns; sandwich-like foods such as hamburgers, hot dogs, corn dogs, and the like.

The replica meat may include only the base material of the present invention or may further include other materials (typically animal meat, fish meat, and flavorings). When an animal meat or a fish meat is included, the mixing ratio of these natural meats and the base material is not particularly limited, and may be, for example, 5:95 to 95:5 (weight ratio). The base material of the present invention has organoleptic properties close to those of natural meats, and therefore organoleptic properties without a feeling of strangeness as a whole can be provided even when it is mixed with a natural meat in an optional mixing ratio.

The flavorings which can be used in combination are not particularly limited, and examples thereof include binding materials such as egg white; materials to form the skeleton of dough such as water, oils and fats, and flavorings; and moreover, solid ingredients, for example, vegetables such as carrot, burdock root, sesame seeds, and onion; and seaweed such as wakame, and hijiki.

However, additives which have been conventionally used to suppress a plant odor and an unpleasant odor and provide a meat feeling may or may not be used in the present invention. Examples of such additives include 0.3 to 1 weight % of sodium bicarbonate, heat-resistant granular gel (including plant protein), equal to or greater than 0.5 weight % of reducing sugar (e.g., glucose, sucrose, and fructose) and the like.

The domestic animal feed in an embodiment contains a sufficient amount of protein, and thus has excellent nutritional values, and also has a proper meat feeling because of the fibrous structure. For the base material of the present invention, for example, grains such as rice, brown rice, rye, wheat, barley, corn, and milo; bran such as wheat bran and defatted rice bran; food manufacturing by-products such as corn gluten meal, corn germ meal, corn gluten feed, and corn steep liquor; vegetable oil cake such as soybean oil cake, rapeseed oil cake, linseed oil cake, and coconut oil cake; oils and fats such as soybean oil and fat, purified powdered tallow, and animal oils and fats; inorganic salts such as magnesium sulfate, iron sulfate, copper sulfate, zinc sulfate, potassium iodide, cobalt sulfate, calcium carbonate, trical-cium phosphate, sodium chloride, and calcium phosphate; amino acids such as lysine, and methionine; vitamins such as vitamin A, vitamin B1, vitamin B2, vitamin B6, vitamin B12, vitamin D3, vitamin E, calcium pantothenate, nicotinamide, folic acid, and choline chloride; fish meal, non-fat dry milk, dried whey, etc., raw grass; dry grass and the like can be used.

The fish bait in an embodiment contains a sufficient amount of protein and thus has excellent nutritional values, and also is not excessively disconnected in water because of the fibrous structure, which provides excellent intake efficiency. In addition to the base material of the present invention, for example, fish meal, meat meal, bone meat, white fish meal, Antarctic krill meal, squid meal, feather meal, oil cake, grains, bran; polysaccharides such as CMC, sodium alginate, and guar gum; food manufacturing by-products, starch, wheat flour, rice flour, rice bran, defatted rice bran, wheat bran, vitamin B1, vitamin B2, vitamin B6, vitamin B12, vitamin C, and niacin as vitamins, inositol, para-aminobenzoic acid, phosphorus, calcium, potassium, sodium, etc. as minerals, fish oil, feed oil, vegetable oil, etc. as oils and fats, and taurine, etc. as others, can be used. It is preferred that these additives be substantially derived from plants, and because the fish bait in the embodiment includes the base material of the present invention, the fish bait has sufficient nutritional values and intake efficiency even when it is used in combination with additives derived from plants and is thus preferred.

EXAMPLES

The amount and stress of each component were measured in accordance with the methods described above in the following examples.
(Soybean Seeds)

As soybean seeds used as a main raw material of the base material, two kinds of germinated soybean seeds obtained by a germination treatment to common soybean seeds over 16 hours or 48 hours based on a technique disclosed in Japanese Unexamined Patent Application Publication No. 2008-125515 (A: treated for 16 hours and B: treated for 48 hours), and soybean seeds before the germination treatment (referred to as ungerminated soybean seeds) were used. The fatty acid composition of germinated soybean seeds and ungerminated soybean seeds, and the amount of phospholipids are shown in Table 1 and Table 2, respectively. It should be noted that the total amount of lipid in seeds was 20 to 23 mass % in all cases.

TABLE 1

| mass % | Palmitic acid | Stearic acid | Oleic acid | Linoleic acid | Linolenic acid |
|---|---|---|---|---|---|
| Ungerminated soybean seeds | 8 | 3.2 | 67.3 | 10 | 5.9 |
| Germinated soybean seeds A | 8 | 2.2 | 73.3 | 5 | 5.6 |
| Germinated soybean seeds B | 10.8 | 4.4 | 75.2 | 2 | 1.8 |

TABLE 2

| g/100 g seeds | Phospholipids (as stearo-oleo-lecithin) |
|---|---|
| Ungerminated soybean seeds | 1.05 |
| Germinated soybean seeds A | 1.40 |
| Germinated soybean seeds B | 1.36 |

EXAMPLE

The germinated soybean seeds A and B were put in an extruder set at one atmosphere of pressure and extruded to adjust its water amount to about 20 mass %. This extrudate was put in a co-rotating twin-screw extruder (pressurizing and heating) and extruded through a die with a pore diameter of 4 mm to obtain a textured base material. The base materials thereof were not covered with oil and did not have foul odors peculiar to linoleic acid and linolenic acid, and oxides thereof. In addition, the amount of protein was about 350 mg/g dry weight base material and about 370 mg/g dry weight base material.

Comparative Example 1

The same conditions as in Example were used except that ungerminated soybean seeds were used. The first extrudate from the extruder were covered with oil, and the second extrudate from the extruder did not have a fibrous structure and was not a textured base material.

Comparative Example 2

The same conditions as in Comparative Example 1 was used except that a large amount of purified soybean protein was mixed with ungerminated soybean seeds. The second extrudate from the extruder was a textured base material having a fibrous structure but was covered with oil and had foul odors peculiar to linoleic acid and linolenic acid, and oxides thereof. In addition, the amount of protein was about 530 mg/g dry weight base material.

Comparative Example 3

Each of two kinds of common defatted soybeans (A and B) after expressing oil from soybean seeds was put in the co-rotating twin-screw extruder (pressurizing and heating) used in Example and extruded through a die with a pore diameter of 4 mm to obtain a textured base material. However, all the base materials had foul odors peculiar to linoleic acid and linolenic acid, and oxides thereof.

The fatty acid composition and the amount of phospholipids in the textured base materials obtained in Example (the base material derived from germinated soybean seeds A) and Comparative Example 3 are shown in Table 3 and Table 4, respectively.

TABLE 3

| mass % | Palmitic acid | Stearic acid | Oleic acid | Linoleic acid | Linolenic acid |
|---|---|---|---|---|---|
| Defatted soybean base material A | 28 | 5.8 | 13.5 | 42.3 | 5.6 |
| Defatted soybean base material B | 30 | 5.6 | 14.2 | 48 | 5.8 |
| Germinated soybean base material | 5 | 3 | 66 | 2.2 | 0.4 |

In the defatted soybean base materials A and B, the total amount of lipid was 1.5 mass % and 1.3 mass % with respect to the dry base material, and thus the total amount of linoleic acid and linolenic acid can be calculated at 0.71 mg/g dry weight base material and 0.69 mg/g dry weight base material.

In the germinated soybean base material, meanwhile, the total amount of lipid was 14.0 mass % with respect to the dry base material, and thus the total amount of linoleic acid and linolenic acid can be calculated at 0.36 mg/dry weight base material.

TABLE 4

| mg/g dry weight base material | Phospholipids (as stearo-oleo-lecithin) |
|---|---|
| Defatted soybean base material A | 0.2 |
| Defatted soybean base material B | 0.1 |
| Germinated soybean base material | 3.3 |

In Example (the base material derived from germinated soybean seeds A), the total amount of free amino acids was about 960 μg/g dry weight base material, and the total amount of taste amino acids (glutamic acid, aspartic acid, alanine, serine, glycine, and threonine) was about 545 µg/g dry weight base material.

In Comparative Example 2, meanwhile, the total amount of free amino acids was about 416 µg/g dry weight base material, and the total amount of taste amino acids (glutamic acid, aspartic acid, alanine, serine, glycine, and threonine) was about 229 µg/g dry weight base material.

Figure 2:
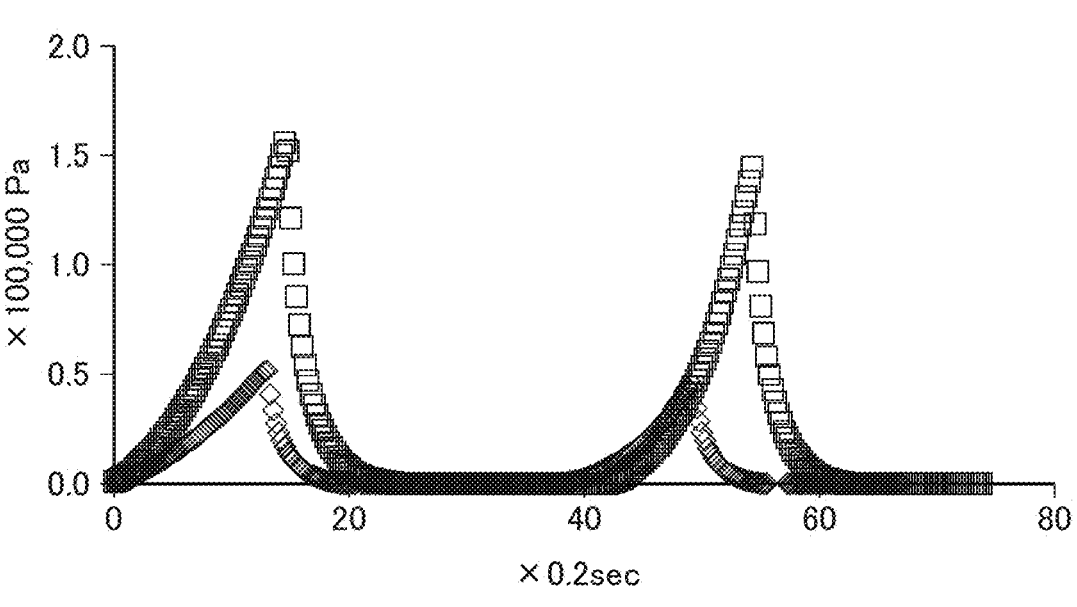
FIG. 2 is a graph which shows the stress profile of the base materials according to Example and Comparative Examples of the present invention.
Figure 3:
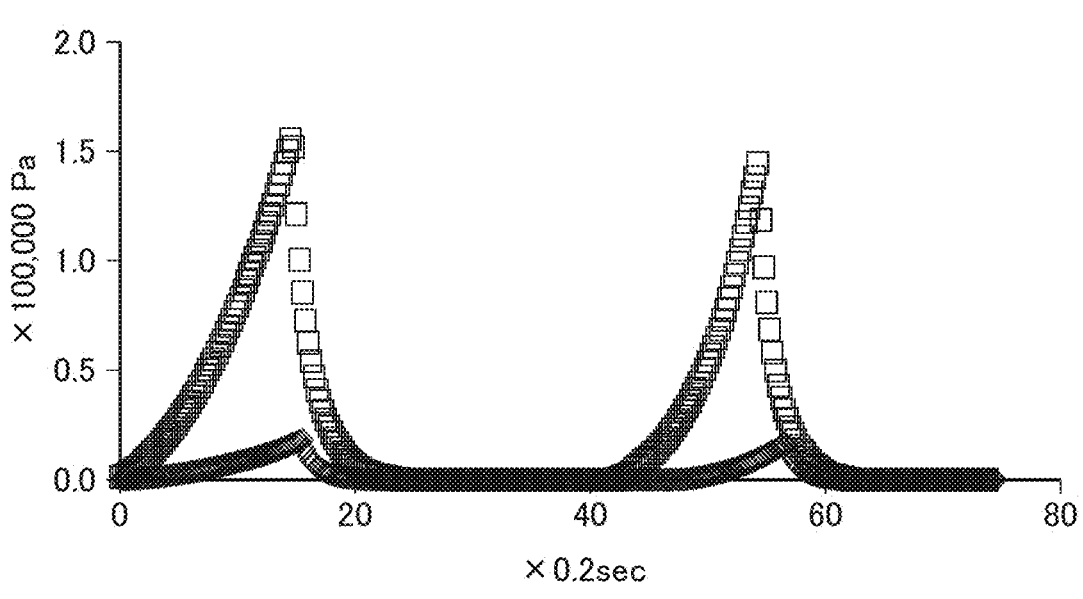
FIG. 3 is a graph which shows the stress profile of the base materials according to Example and Comparative Examples of the present invention.

Next, each base material, and a commercially available roasted chicken product and boiled chicken product were subjected to the elasticity test using a rheometer. The stress profiles are shown in FIGS. 1 to 3. The stress calculated based on these profiles was about $1.5 \times 10^5$ Pa in the base material in Example ("Textured base material" in FIGS. 1 to 3), about $0.4 \times 10^5$ Pa in the base material in Comparative Example 3 ("Benchmark" in FIG. 2), and about $0.15 \times 10^5$ Pa in the base material in Comparative Example 2 ("Untreated base material" in FIG. 3).

As shown in FIGS. 1 to 3, only the textured base material in Example showed the same stress profile as those of the roasted chicken product and boiled chicken product (about absolute values and slight reductions in stress from the first peak to the second peak).

(Performance Evaluation)

The replica meats after reconstituting base materials with water until reaching a saturated state were evaluated by monitors about the off-flavor, unpleasant odor, texture, and taste thereof. This result is shown in Table 5.

TABLE 5

| | Off-flavor | Unpleasant odor | Texture | Taste |
|---|---|---|---|---|
| Example (derived from germinated soybean seeds A) | Flavor like meat without off-flavor peculiar to plants. | No unpleasant odor peculiar to vegetable oils, oxidized oils, and the like. | Chewy texture close to meat. | Felt umami of meat. |
| Example (derived from germinated soybean seeds B) | Flavor like meat without off-flavor peculiar to plants. | No unpleasant odor peculiar to vegetable oils, oxidized oils, and the like. | Chewy texture close to meat. | Felt umami of meat. |
| Comparative Example 1 | Off-flavor peculiar to plants. | Unpleasant odor peculiar to vegetable oils, oxidized oils, and the like. | No fibrous texture at all and severe pasty texture. | Umami not felt. |
| Comparative Example 2 | Severe off-flavor peculiar to plants. | Severe unpleasant odor peculiar to vegetable oils, oxidized oils, and the like. | Fibrous texture, but unbalanced with flavor and taste; unnatural texture, | Umami not felt. |
| Comparative Example 3 (Defatted soybean base material A) | Severe off-flavor peculiar to plants. | Severe unpleasant odor peculiar to vegetable oils, oxidized oils, and the like. | Fibrous texture, but unbalanced with flavor and taste; unnatural texture. | Umami not felt. |
| Comparative Example 3 (Defatted soybean base material B) | Severe off-flavor peculiar to plants, | Severe unpleasant odor peculiar to vegetable oils, oxidized oils, and the like. | Fibrous texture, but unbalanced with flavor and taste; unnatural texture. | Umami not felt. |

The invention claimed is:

1. A plant-based textured base material, comprising a fibrous structure containing plant protein, linoleic acid and linolenic acid in a total amount of equal to or less than 25 mg/g dry weight base material, phospholipids in an amount of equal to or greater than 0.5 mg/g dry weight base material, and protein in an amount of equal to or less than 540 mg/g dry weight base material.

2. The base material according to claim 1, which has a protein amount of equal to or less than 520 mg/g dry weight base material.

3. The base material according to claim 1, having a stress of equal to or greater than $0.7 \times 10^5$ Pa.

4. The base material according to claim 1, which has an amino acid amount of equal to or greater than 800 µg/g dry weight base material.

5. The base material according to claim 1, which is produced by using germinated soybean seeds as a raw material.

6. The base material according to claim 5, which is produced by further using germinated seeds of beans other than soybeans as a raw material and is swollen.

7. A product containing a replica meat obtained by processing the base material according to claim 1.

* * * * *